United States Patent [19]

Wier

[11] Patent Number: 5,863,476

[45] Date of Patent: Jan. 26, 1999

[54] APPARATUS AND METHOD FOR COMPACTING AND STABILIZING GRANULAR MATERIALS CONTAINING HAZARDOUS MATERIALS

[76] Inventor: Keith E. Wier, 1291 High St., Unit F, Denver, Colo. 80218

[21] Appl. No.: 782,431

[22] Filed: Jan. 15, 1997

Related U.S. Application Data

[60] Provisional application No. 60/010,040, Jan. 16, 1996.

[51] Int. Cl.$^6$ ........................................... B28B 1/087

[52] U.S. Cl. ........................... 264/72; 264/122; 425/421; 425/423; 425/429; 425/432; 425/453; 425/456

[58] Field of Search .................................. 264/69, 71, 72, 264/122, 37, DIG. 69, 36.18, 36.2; 110/346; 425/167, 352, 412, 419, 421, 428, 429, 432, 453, 456

[56] References Cited

U.S. PATENT DOCUMENTS

| | | |
|---|---|---|
| 4,456,574 | 6/1984 | Frey et al. . |
| 4,531,903 | 7/1985 | Frey et al. . |
| 4,751,033 | 6/1988 | Kankkunen . |
| 5,199,354 | 4/1993 | Wood ...................................... 110/346 |
| 5,228,803 | 7/1993 | Crosby et al. ........................... 110/346 |
| 5,234,485 | 8/1993 | Bölsing . |
| 5,248,466 | 9/1993 | Russell III . |
| 5,340,396 | 8/1994 | Meegoda . |
| 5,377,604 | 1/1995 | Pichat ...................................... 110/346 |
| 5,655,465 | 8/1997 | Robertson ................................ 110/346 |

OTHER PUBLICATIONS

Enr, Mary Buckner Powers, "Site Treatment Plant Delayed", Dec. 25, 1995, p. 18.

Econ, J.C. Whitehouse, C.M. Jantzen, F.R. Van Ryn, D.H. Davis, "Disposing Waster", Dec. 1995, p. 14.

Enr, Andrew G. White, "Plasma Arc Cleanup About To Catch Fire", Nov. 27, 1995, pp. 45–46.

*Primary Examiner*—Mathieu D. Vargot
*Attorney, Agent, or Firm*—Donald W. Margolis; John R. Wahl

[57] ABSTRACT

Apparatus and methods for stabilizing soils and other granular materials at the site at which they are located. The apparatus includes a platform, fixed or mobile at a contamination site, carrying a hopper for receiving contaminated material to be stabilized including additives as required, a mixer for introducing additives to the material connected to the hopper, a mechanism for transporting contaminated granular materials from an adjacent contaminated site to the mixer, at least one mold having at least one movable wall, a harmonic compactor to form a uniformly dense, solid compacted preform body, and a discharge station for handling or holding the preform. Where desired or required an air dryer, thermal curing chamber or sintering furnace may be used to dry and/or fuse the preform into a final block. The method includes the steps of introducing a contaminated soil mixture, or other granular material, into a mold having at least one movable wall, applying an appropriate pneumatic preload force to the material in the mold, repetitively accelerating the mold in vibration followed by repetitive impact forces up to, but not exceeding the yield strength of the binding material with the lowest yield strength in the mixture to form a solid preform, removing the preform and allowing it to air dry, or subjecting it to low temperature cure or sintering to stabilize the material contained therein.

17 Claims, 3 Drawing Sheets

APPARATUS AND METHOD FOR COMPACTING AND STABILIZING GRANULAR MATERIALS CONTAINING HAZARDOUS MATERIALS

RELATED U.S. APPLICATION DATA

This application claims the benefit of and is a continuation in part of United States Provisional Application Ser. No. 60/010,040 filed Jan. 16, 1996 for APPARATUS AND METHOD FOR COMPACTING AND STABILIZING SOILS CONTAINING HAZARDOUS MATERIALS.

BACKGROUND OF THE INVENTION

1. Field of the Invention

The present invention is generally related to stabilization of soil and other granular materials, and more particularly to containment of and prevention of leaching of hazardous materials from such granular materials.

2. Description of the Related Art

Many techniques have been proposed or tried for eliminating or at least containing hazardous waste materials, such as heavy metals, organic compounds and other toxic or hazardous materials. from contaminated soil and from other granular material. When such toxic or hazardous materials migrate into the soil they are even more difficult and expensive to eliminate or contain. For example, wastes generated at countless mineral mining operations have historically been discharged to the local environment and are only now, as a part of the Super Fund operation, being assessed for the extent and impact of their contamination upon the soil and environment. For example, only now is waste generated at facilities such as the Idaho National Engineering Laboratory, the U.S. Department of Energy's Savannah River, Hanford, Washington sites and Rocky Flats, Colorado nuclear trigger production plant during the cold war being retained and to some extent remediated in temporary storage facilities. Some of these storage facilities have in the past unintentionally or unknowingly produced radioactive and/or heavy metal contamination of the underlying soils. As a result, these soils must be dealt with in a manner to render such contamination benign.

For the most part current efforts to clean up these sites and other historically identified hazardous waste sites around the country and around the world have primarily involved excavation and removal of the contaminated soils to a different location for burial in lined pits, or in remote caves, or in sealed drums. However, such efforts do not eliminate the problem, but only temporarily transfer it to someplace else. More permanent solutions have been primarily directed to high toxicity wastes and volume reduction techniques to make the storage considerations more manageable.

Proposals for stabilization of hazardous materials almost all include some concentration of the soils to reduce their volume. The resultant concentrate can then be stabilized via methods such as mixing with concrete or other binding material, or vitrification via combining the concentrate with silica sand and then heating the mixture at sufficiently high temperature in a furnace to cause vitrification of the mixture. These methods have a relatively high energy cost compared to simple burial or drum containment. However, the long term stability of the vitrified material is more predictable and reliable than burial or containment.

Excavation and transport of contaminated soils to a suitable burial facility or toxic waste concentrating facility for treatment is also very costly and labor intensive. Consequently there remains a need for a cost effective and energy efficient method for stabilizing soils contaminated with hazardous material in a manner such that the soil is rendered effectively harmless without the need for transport or concentration. There is also a need for an energy efficient and cost effective apparatus and method for stabilizing hazardous materials such as low level radioactivity or heavy metal contaminated soils or toxic chemical contaminated mine tailings, preferably in a form that either eliminates leaching of the hazardous material or reduces them to an acceptable level.

SUMMARY OF THE INVENTION

It is thus an object of the present invention to provide a method for stabilizing granular materials, such as soils containing hazardous material in a manner in which the hazardous material is permanently contained within a uniformly dense, solid compacted body.

It is another object of the present invention to provide a transportable apparatus for stabilizing contaminated soils or other granular material containing hazardous materials at the location of the contaminated soils so as to eliminate the need to transport or concentrate the soil.

It is yet another object of the present invention to provide an apparatus for stabilizing soils or other granular materials containing hazardous materials within a uniformly dense, solid compacted body, and then storing the compacted body in the vicinity from which it was removed.

The present invention specifically overcomes the disadvantages in the prior art discussed above. The method in accordance with the present invention basically comprises the steps of: 1) excavating a site containing contaminated granulated materials such as soils containing hazardous material; 2) loading a portion of the excavated soil into a cavity of a mold having at least one movable side; 3) repetitively subjecting such granulated materials in to such a mold; 4) applying an acceleration of a magnitude in the range of about at least 25 G' to about 5000 G's to form a uniformly dense, solid, compacted body, preform; and 5) returning the preform to the excavation site or to a storage area in the vicinity. This process is then repeated for another portion of the excavated contaminated granular material as many times as is necessary to process all of the granular material. In preferred embodiments, the preform may be dried, if necessary, and then heated or sintered to form a vitreous block in order to completely eliminate any leaching of hazardous materials from the block.

The apparatus for stabilizing contaminated granular materials by forming a uniformly dense, solid, compacted preform body, in accordance with the present invention preferably is carried on a mobile vehicle so that it may be easily and conveniently moved to the hazardous material site. Such a mobile vehicle may be on transportable skids, on wheels such as a trailer truck or truck bed, or on a floatation vehicle, the vehicle providing a support platform. A mixer is supported above the platform for admixing to-be-stabilized contaminated material and binding additives. Below the mixer is a hopper which is supported by the platform. The hopper is positioned to receive to-be-stabilized contaminated material and binding additives from the mixer. At least one mold is located downstream from the hopper. The mold is designed and positioned to receive admixed to-be-stabilized contaminated material and binding additives. As is disclosed in my U.S. Pat. No. 4,456,574, the mold has at least one movable wall and a discharge station. A repetitive harmonic compactor is in contact with the movable wall of the mold for compacting the soil in the mold into uniformly dense, solid, compacted preforms. A discharge station is located adjacent the mold to receive the preforms from the mold after compaction is completed. The discharge station of the apparatus on the platform may optionally include a dryer for receiving the preforms from the compactor and removing any residual moisture therefrom. As a further option a high temperature furnace for sintering the preform may be carried on the platform to thereby further reduce the potential for leaching of hazardous materials from the preforms. Subsequently the preform is passed from the platform and returned to the excavation site or to a storage area in the vicinity.

In preferred embodiments, the mobile apparatus of the present invention may include a sealed air handling unit to filter, scrub or otherwise remove airborne hazardous materials from the compactor environment. The configuration of the air and gas handling unit may be designed specifically for the known contamination being dealt with and/or may be of general commercial design depending on the particular site requirements.

The heart of the apparatus in accordance with the present invention is the use of the vibratory compaction device disclosed in my U.S. Pat. No. 4,456,574, for contaminated soil dewatering and compaction, the disclosure of which is hereby incorporated by reference in its entirety. This compactor apparatus subjects granular material such as sand in the soil in the mold to low fixed and static interparticle forces to form a confined particle mass approximating the desired shape while the shape is subjected to rapid decelerations and/or accelerations whereby the kinetic energy of each particle throughout the mass is dissipated through the particle micro impacts with adjacent particles to induce compaction and diffusion of the particles evenly and thoroughly throughout the mass. The high forces throughout the mass not only induce fusion, but tend to break weak bonding between the particles which occur in the event of relatively substantial voids between the particles. The compactor confines the mass of soil within the mold having at least one movable wall and preloads this wall with a preload force well below that necessary to fuse the mass to the movable portion, and then rapidly impacting the mold at the movable portions thereof at opposed ends of a distinct displacement of the contents of the mold, usually in a vertical direction between an oscillating table and an under damped pneumatic system tuned to oscillate in phase with the table. The preform which results from this series of repeated impact accelerations is a uniformly dense, solid compacted body.

These and other objects of the present invention will become apparent to those skilled in the art from the following detailed description and accompanying drawings, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings which are incorporated in and form a part of this specification illustrate complete preferred embodiments of the present invention according to the best modes presently devised for the practical application of the principles thereof, and in which.

DETAILED DESCRIPTION OF THE INVENTION

Figure 1:
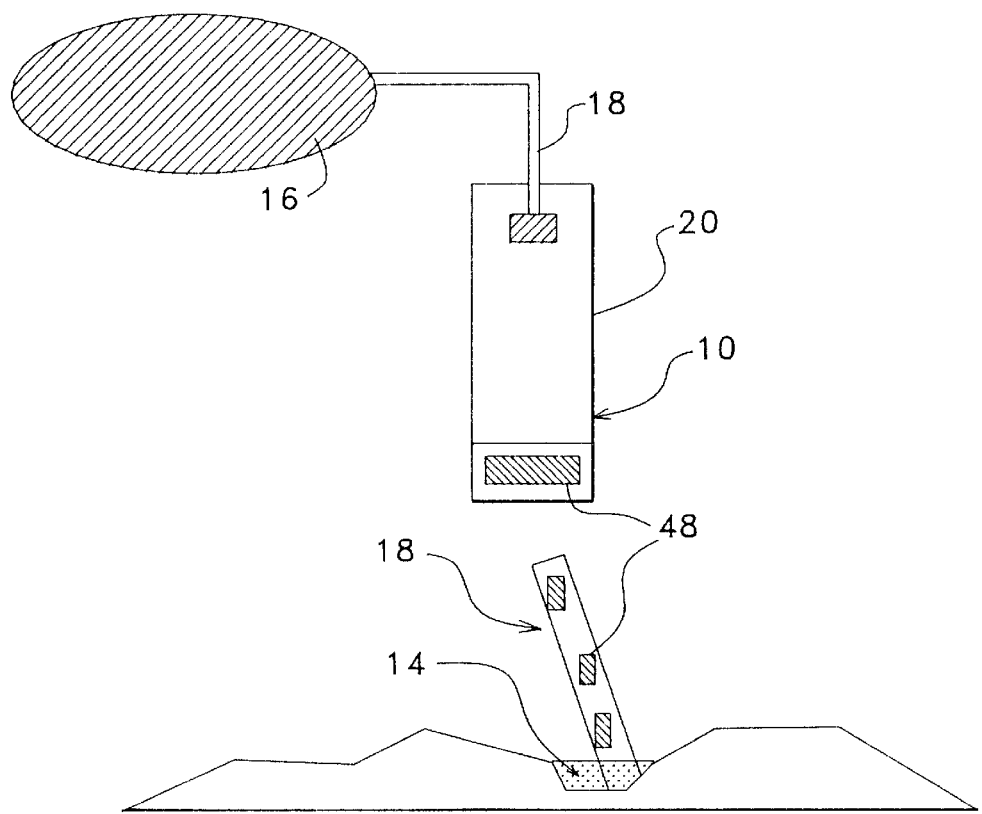
FIG. 1 is a diagrammatic view, not to scale, of a system showing the placement of the apparatus of the present invention in accordance with the invention designed for use at a radioactive tailing site.

For the purposes of promoting an understanding of the principles of the present invention, reference will now be made to the embodiments and alternatives illustrated in the drawings, and specific language will be used to describe the same. It will nevertheless be understood that no limitation of the scope of the present invention is thereby intended. The embodiments illustrated and explained are exemplary only. Like reference numerals are used to designate similar structures in the views of the various figures. Alterations and modifications of the illustrated apparatus and methods, and such further applications of the principles of the present invention as illustrated therein being contemplated as would normally occur to one skilled in the art to which the present invention relates are intended to be within the scope of the present invention.

Referring now to FIG. 1, a portable apparatus 10 in accordance with a first embodiment of the present invention is shown in a diagrammatic view assembled at a typical mining site, such as an abandoned uranium mine 12 at which radioactive tailings have been discarded in previous mining operations. The apparatus of the present invention 10, is enclosed within a wheeled truck trailer or on one or more transportable skids so as to be predominantly self contained, and mobile. Apparatus 10 is supported on a platform 11, and is preferably positioned in close proximity to both the mine excavation 14 and the contaminated tailings 16. A conventional conveyor system 18 is positioned between the apparatus 10 and the tailing 16 for use in transporting the granular tailings to apparatus 10. Similarly, a second conveyor system 18 is positioned between the apparatus 10 and the mine excavation 14 for use in transporting the treated materials to excavation 14 for disposal.

The overall objective in this first embodiment is to process the tailings 16 into a stabilized uniformly dense, solid compacted preform body, for example in the form of a block 48, and then depositing the stabilized blocks in the immediate vicinity, say in excavation 14 via conveyor system 18. By disposing of the blocks 48 in the excavation there is the double benefit of filling the exposed excavation 14 and of burying the stabilized tailings soil blocks 48. Alternatively, if the excavation has already been filled and sealed the stabilized blocks 48 may be deposited and buried in the now cleared location where the tailings 16 had been stored, or elsewhere in the immediate vicinity. In any event, it is a primary benefit of the use of the apparatus and method of the present invention that the contaminated materials can be treated at the site that they are located, and then disposed of in the immediate vicinity, thereby avoiding both the cost and the hazards of transporting the materials over substantial distances.

Figure 2:
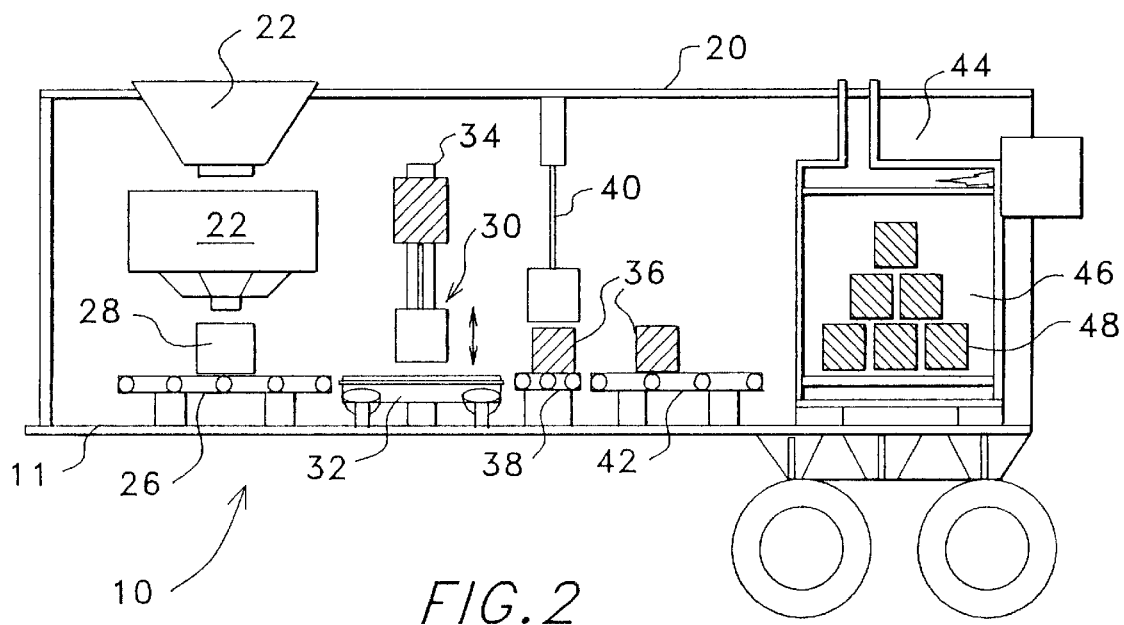
FIG. 2 is a cross-sectional schematic internal side view of the apparatus of present invention shown in FIG. 1.

A cross-sectional schematic internal side view of the apparatus 10 is shown in FIG. 2. The apparatus 10 comprises a mobile platform or carriage 11 carried by a trailer 20. A soil loading hopper 22 is mounted through the roof portion of trailer 20 and above platform 11 to receive to-be-treated contaminated material. A mixer 22, for adding binders and enhancers as may be required due to the particular soil composition involved, is located below the exit chute of hopper 22 and above platform 11. The hopper 22 and mixer 24 are preferably vertically oriented over a conveyor table 26 which is designed to carry a mold 28 so that the mold 28 can be positioned beneath the mixer 24, and thence to a harmonic compactor 30.

The compactor 30 confines the granular mass within the mold 28. Mold 28 has at least one movable wall. Compactor 30 preloads this movable wall with a preload force well below that which would fuse the mass to the movable wall. Then compactor 30 rapidly impacts the mold at the movable portions thereof at opposed ends of a distinct displacement of the contents of the mold 28, in a vertical direction between an oscillating table 32 and an under damped pneumatic system 34 which is tuned to oscillate in phase with the table 32. As a result of this treatment harmonic compactor 30 forms the contaminated material and additives in the mold 28 into a uniformly dense, solid compacted preform body 36 by vertically accelerating the filled mold 28 on a vibratory table 32. The repeated high velocity impacts produced by vibratory table 32 and harmonic compactor 30 produce high internal forces within the mold 28, thereby reducing the volume of the material within mold 28 by approximately 30% and attaining the closest possible packing configuration for the materials in the mold. More specifically, the compactor 30 subjects the particulate matter including the contaminated material and additives in the mold, such as sand or other binder material, to low fixed and static interparticle forces to form a confined particle mass approximating the internal shape of mold 28 while subjecting the materials to rapid decelerations and/or accelerations, whereby the kinetic energy of each particle throughout the mass within mold 28 is dissipated through the particle micro impacts with adjacent particles to induce compaction and diffusion of the particles evenly and thoroughly throughout the mass. The high forces throughout the mass not only induce fusion between the granules, but tend to break preexisting weak bonding between the granules which occur in the event of relatively substantial voids between the particles. The impact forces applied are preferably on the order of 1 millisecond in duration followed by a relaxation period of about 50 milliseconds. The magnitude of the forces applied are preferably chosen such that they are up to but do not exceed the yield strength of the binding material present with the lowest yield strength.

The preform body 36 which results from this series of repeated impact accelerations is a uniformly dense, solid compacted body. The preform 36 is then transferred to an ejection station 38 where a ram 40 removes the preform 36 and positions it on a rolling station 42 for loading into a discharge station 44 at which post compaction treatment may take place. The discharge station 44 preferably may combine dewatering, heat conditioning and then sintering in a furnace or kiln 46. The Thermal treatment required may also include low temperature curing to achieve the desired final structural and chemical characteristics. The resultant blocks 48 formed from the preforms 36 are then transported to and discharged for example into the excavation 14 via conveyor 18 as shown in FIG. 1.

Figure 3:
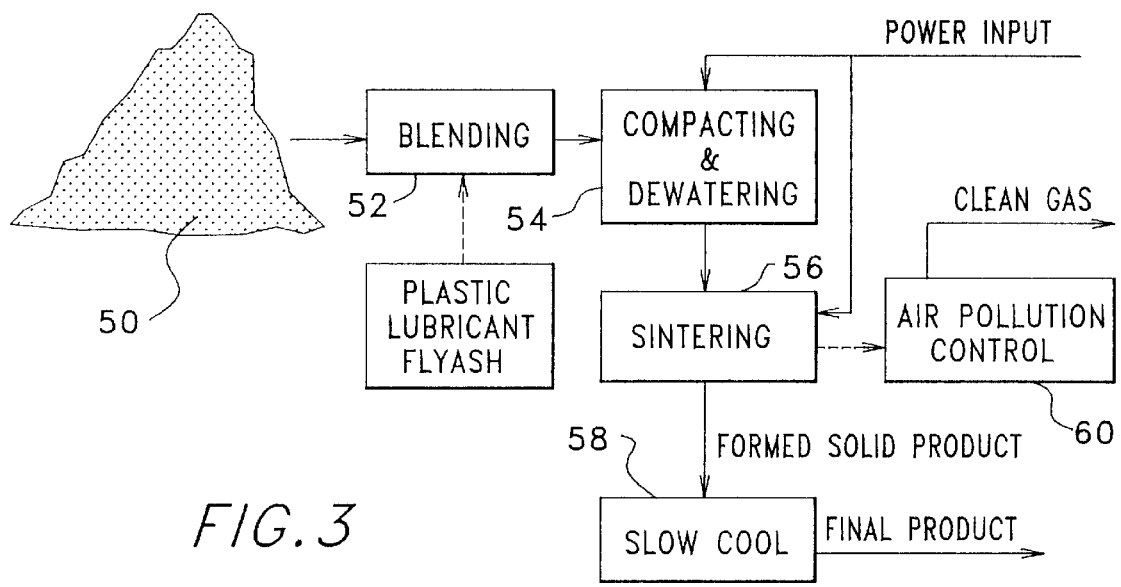
FIG. 3 is a block diagram illustrating the process of the present invention shown adapted to stabilization of contaminated materials.

Turning now to FIG. 3, a block diagram of a radioactive waste material stabilization apparatus in accordance with the present invention is shown. The contaminated soil 50 or other radioactively contaminated product to be stabilized is fed to a blending station 52 where compaction lubricants, fly ash, or other modifiers are added to the soil and the combination mixed. The blended soil is then fed through a hopper to the harmonic compactor 54 which functions as described above. The compacted preforms formed in the compactor 54 are then transferred into a sintering or curing furnace 56 to form the final solid product. This product is then transferred to a slow cool station 58 for final treatment and discharge to shipping or storage. Each of the stages may be contained within an air sealed compartment or passage which feeds to the air pollution control portion 60 of the apparatus 50. The air pollution control portion 60 maintains a slight negative pressure at all stations to prevent contaminant discharge and provides particulate filtration, scrubbing, monitoring and other conventional processing of all effluent gases prior to and during atmospheric discharge. Accordingly, all radioactive contamination is contained and handled within the confines of the apparatus in accordance with recognized practices.

Figure 4A:
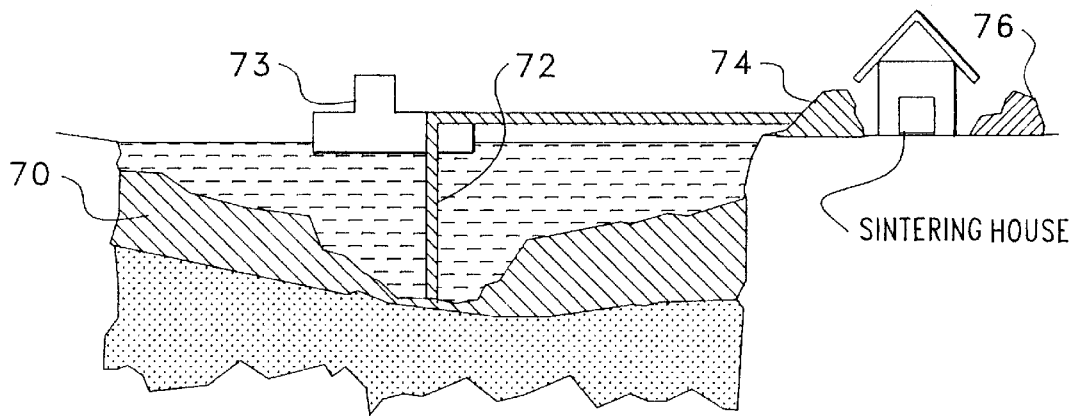
FIGS. 4A and 4B are a diagrammatic representation of the apparatus of the present invention located on a floatation vessel or adjacent to a body of water and adapted to stabilization of contaminated sediments using the apparatus and methods of the present invention.
Figure 4B:
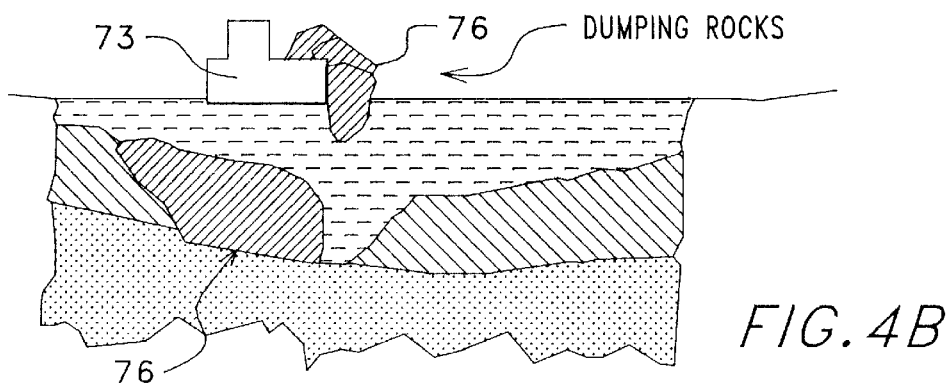

FIGS. 4A and 4B show a second embodiment of the apparatus in accordance with the present invention in which the apparatus is adapted for processing contaminated sediments underlying a body of water such as a lake or river channel. Here the contaminated sediment or soil 70 is excavated via a dredge 72 on a floatation vessel 73. Then the contaminated sediments may be treated on vessel 73 using the methods and apparatus of the present invention. In the alternative the contaminated sediments may be transported to a contaminated pile 74 on shore, and is then processed in accordance with the present invention by harmonic compaction and then sintering, for example into the shape of rocks 76. Rocks 76 are then returned to the bed of the body of water.

As in the first two embodiments above described, the method of soil stabilization in accordance with the present invention comprises the steps of: 1) excavating a site containing contaminated or hazardous material; 2) loading a portion of the excavated material, including binder material into a cavity of a mold having at least one movable side; 3) preloading the movable side of the mold; 4) repetitively subjecting the soil in the mold to an acceleration of a magnitude of at least 25 G's to 50 G's and preferably 500 to 5000 G's to repetitively apply a force up to but not greater than the yield strength of the binding material having the lowest yield strength of the binding materials present in the mixture to thereby form a solid preform; and 5) returning the preform to the vicinity of the excavation site. This process is as many times as is necessary to process all of the contaminated sediment.

Before returning the preform to the site, the above method may be modified after compaction by including the steps of drying the preform and, if necessary, sintering or vitrifying the preform in a furnace such as a gas kiln furnace to form a sintered block or rock in order to completely eliminate any leaching of hazardous materials from the block.

EXAMPLES

Samples of dry soil from Hanford, Washington were obtained and formed into blocks in accordance with the present invention. Specifically, a first 16 pound sample of Hanford soil was placed in a mold and compacted in accordance with the teachings of U.S. Pat. No. 4,456,574. The soil was compacted for 3 seconds. The preform was then dried for 12 hours and subsequently sintered at 1700° F. for a total kiln firing and cooling time of 30 hours. The resultant blocks evidenced a volume reduction of approximately 30% and had a heavy metal Toxic Chemical Leaching Potential (TCLP) that was below detectable. The energy consumption calculated for this process based on the assumption of 500 pound block formation was approximately 6000 BTU per ton formation and 800,000 BTU per ton for sintering.

A second 16 pound sample of Hanford soil was placed in a mold and compacted in accordance with the teachings of U.S. Pat. No. 4,456,574. The soil was compacted for 3 seconds. The preform was then fired in a kiln at 400° F. and then cooled for 12 hours. The resultant block again evidenced a volume reduction of approximately 30%. However, in this example Cadmium leached at 0.3 mg/L. The TCLP for all other heavy metals was below detectable. The energy consumption calculated for this process based on the assumption of 500 pound block formation was approximately 6000 BTU per ton formation and 100,000 BTU per ton for sintering.

Figure 5:
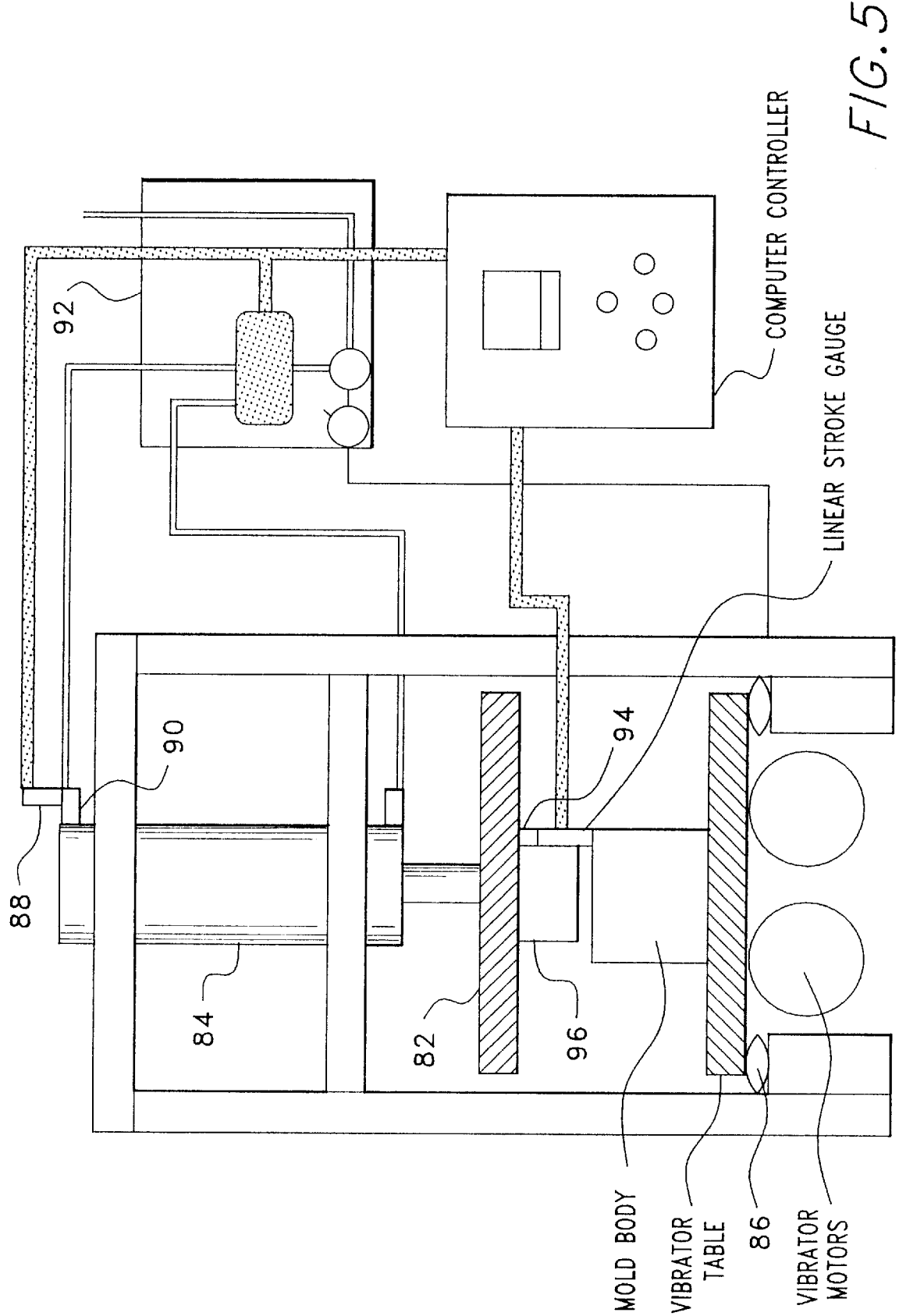
FIG. 5 is a cross-sectional schematic view of an improved compaction device which is suitable for use in the practice of the present invention.

FIG. 5 shows a cross-sectional schematic view of an improved compaction device 80 which is suitable for use in the practice of the present invention. The improved compaction device 80 includes and uses a massive upper cross head 82 connected to an upper cylinder 84 whose mass is substantially equivalent to that of the oscillating table 32 to thereby significantly reduce the impact sound volume during vibratory impact. This allows fabrication of parts varying over a wide range of shapes ranging in weights from 10 lb. to 2000 lb. on the same apparatus. Furthermore, by providing multiple air cushion springs 86 in a linear array the shape weight capability of the apparatus is increased. A pressure sensor 88 is mounted at the cylinder upper chamber port 90. Pressure sensor 88 allows the actual air pressure in the cylinder to be monitored for the purpose of controlling that pressure during compacting operations. Pneumatic manifold 92 is used to change upper cylinder pressure during operation under either manually or under computer control. Changing pressure in the cylinder upper chamber 84 during the motor vibration cycle controls the granular flow and compaction forces which are applied to the material in the mold 28. Where a computer, not shown, is used it will be operated by control software which can direct the pressure in the upper chamber 84 to change in value during the operation of the oscillating table 32. Accelerometers 94 located on the shape mold 28, or placed internal to the part to determine the force of each impact on shapes during forming compaction cycle of the body.

Where a computer is used to control the pneumatic manifold 92, then the accelerometer impact force information can also be used to control cylinder upper chamber pressure to control desired impact force levels as required, and to achieve optimized specific designed mixing, compaction and filling of shaped parts. Use of accelerometers on the motors or vibrating table and/or the molds, or in the compacted material, can be used to transmit data of such vibration frequency motion to a controller which would change frequency and upper cylinder pressure in a feedback loop to achieve desired optimal granular flow and compaction. The addition of a linear motion device, not shown, between upper cross head 82 and top mold punch 96 can would serve to describe mold closure motion, which would in turn provide information as to the compaction rate, percent, and point of closure. Feedback of such information to a computer or controller could be used to alter upper cylinder pressure as needed, alter motor frequency as needed, stop motors upon mold closure or to achieve designed impact forces.

While the present invention has been described above with reference to specific preferred embodiments thereof, it is apparent that many changes, modifications, and variations can be made without departing from the inventive concept disclosed herein. For example, different shaped final products may be made in accordance with the present invention. These final shapes may potentially be used in construction and other applications. Recycled glass and other additives may be introduced into the mixer to blend with the contaminated material to greatly reduce the final porosity and hence reduce the leach ability of contaminants in the final product. The preform may also be sprayed with glass particles prior to the final kiln heating to further reduce porosity and reduce leaching by creating a glass envelope around the sintered preform.

The compacting and sintering method of the present invention could also be used to form radioactivity shielding systems from depleted uranium oxides in combination with silicon dioxide or other substrate materials, in contrast to the systems presently contemplated by W. J. Quapp et al, *Depleted Uranium Hexafluoride: The Source Material For Advanced Shielding Systems*, an INEL internal document which suggests incorporating the uranium oxides into concrete.

Other uses of the methods and apparatus of the present invention may be the stabilization of non-radioactive waste materials, such bauxite tailings, including the formation of these tailings into building components such as roof tiles, flooring, pipe, building blocks and various barriers. The rocks formed from lake sediment described with reference to FIG. 4 above may alternatively used for rip rap and other water diversion structures. The apparatus and method of the present invention may also be used in landfill volume reduction, dewatering of materials, fly ash stabilization, and plating industry hazardous waste disposal.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein. Accordingly, the teaching of the present invention is intended to embrace all such changes, modifications, and variations that fall within the spirit and broad scope of the appended claims.

All patents, patent applications, and other publications cited herein are hereby incorporated by reference in their entirety.

The inventions in which exclusive rights are claimed are:

1. An apparatus for stabilizing and disposing of contaminated granular materials at a contaminated site by forming a dense, solid compacted body in a mold, comprising:
   a platform;
   at least one mold carried by said platform, said mold designed and positioned and adapted for receiving to-be-stabilized contaminated granular material, said mold having at least one laterally movable wall;
   means for transporting contaminated granular material from the contaminated site to said mold having at least one laterally movable wall; and a harmonic compactor in contact with said laterally movable wall of said mold; whereby when a contaminated granular material is fed into said mold having at least one laterally movable wall, and said harmonic compactor is first used to apply a pneumatic preload force to any granular material in said mold sufficient to compact any such granular material, and then further using said harmonic compactor to repetitively accelerate said laterally movable wall of said mold in vibration, followed by repetitive impact forces up to, but not exceeding the yield strength of the granular material having the lowest yield strength in the mold, to thereby form a dense, compacted solid body.

2. The apparatus of claim 1 wherein said platform is mobile.

3. The apparatus of claim 2 wherein said mobile platform is mounted on wheels.

4. The apparatus of claim 2 wherein said mobile platform is mounted on skids.

5. The apparatus of claim 2 wherein said mobile platform is mounted on a floatation vessel.

6. The apparatus of claim 1 wherein a mixer is supported above said platform for receiving contaminated granular material from the contaminated site and admixing to-be-stabilized contaminated material and binding additives, said mixer positioned to feed said admixture to said mold.

7. The apparatus of claim 1 wherein a hopper is located above said platform, said hopper being designed and positioned and adapted for receiving contaminated granular material from the contaminated site and admixing to-be-stabilized contaminated material and binding additives, said hopper positioned to feed said admixture to said mold.

8. The apparatus of claim 6 wherein a hopper is located above said platform, said hopper being designed and positioned and adapted for receiving contaminated granular material from said mixer and further admixing to-be-stabilized contaminated material and binding additives, said hopper positioned to feed said admixture to said mold.

9. The apparatus of claim 1 wherein a heating device is located downstream from said mold, whereby a dense, solid compacted solid body, which has been removed from said mold may be subjected to heating to stabilize the material contained therein.

10. The apparatus of claim 9 wherein said heating device is a thermal curing oven.

11. The apparatus of claim 9 wherein said heating device is a sintering oven.

12. A method for stabilizing and disposing of contaminated granular materials at a contaminated site by forming a dense, solid compacted body in a mold, comprising the steps of:

feeding to-be-stabilized contaminated granular material from the contaminated site into a mold, said mold having at least one laterally movable wall;

activating a harmonic compactor in contact with said laterally movable wall of said mold to apply a pneumatic preload force to the granular material in said mold sufficient to compact any such granular material;

using said harmonic compactor to repetitively accelerate said laterally movable wall of said mold in vibration;

using said harmonic compactor to repetitively apply impact forces to said laterally movable wall of said mold up to but not exceeding the yield strength of the granular material with the lowest yield strength in the mixture to thereby form a dense, solid compacted solid body; and then removing the compacted body from said mold and depositing it at or in the immediate vicinity of the previously contaminated site.

13. The method of claim 12 wherein binding additives are admixed with said to-be-stabilized contaminated material before it is fed into in said mold.

14. The method of claim 12 wherein said uniformly dense, solid compacted solid body, which has been removed from said mold is dried to stabilize the material contained therein.

15. The method of claim 12 wherein said uniformly dense, solid compacted solid body, which has been removed from said mold is heated to stabilize the material contained therein.

16. The method of claim 12 wherein said uniformly dense, solid compacted solid body, which has been removed from said mold is heated using a thermal curing oven to thereby stabilize the material contained therein.

17. The method of claim 12 wherein said uniformly dense, solid compacted solid body, which has been removed from said mold is heated using a sintering oven to thereby stabilize the material contained therein.

* * * * *